United States Patent
Woo et al.

(10) Patent No.: US 11,644,175 B2
(45) Date of Patent: May 9, 2023

(54) LAMP FOR VEHICLE

(71) Applicant: SL Corporation, Daegu (KR)

(72) Inventors: Sungmin Woo, Gyeongsan-si (KR); Changkyung Yun, Gyeongsan-si (KR); Jaesun Lee, Gyeongsan-si (KR); Gyosung Lim, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 17/498,087

(22) Filed: Oct. 11, 2021

(65) Prior Publication Data

US 2022/0120406 A1  Apr. 21, 2022

(30) Foreign Application Priority Data

Oct. 20, 2020  (KR) .......................... 10-2020-0135870

(51) Int. Cl.
| | | |
|---|---|---|
| *F21S 43/50* | (2018.01) | |
| *F21S 43/20* | (2018.01) | |
| *F21W 103/60* | (2018.01) | |
| *F21V 11/14* | (2006.01) | |

(52) U.S. Cl.
CPC .............. *F21S 43/50* (2018.01); *F21S 43/20* (2018.01); *B60Q 2300/45* (2013.01); *B60Q 2400/50* (2013.01); *F21V 11/14* (2013.01); *F21W 2103/60* (2018.01)

(58) Field of Classification Search
CPC ........... B60Q 2400/50; B60Q 2300/45; F21W 2103/60; F21V 11/14
See application file for complete search history.

(56) References Cited

U.S. PATENT DOCUMENTS

| | | | | |
|---|---|---|---|---|
| 10,928,029 | B1* | 2/2021 | Woo | ......................... F21S 43/26 |
| 2005/0117364 | A1* | 6/2005 | Rennick | ................. B60Q 9/008 |
| | | | | 362/540 |
| 2016/0370529 | A1* | 12/2016 | Angelini | ............ G02B 27/0994 |
| 2018/0170244 | A1* | 6/2018 | Chen | ......................... G02B 5/32 |
| 2019/0322209 | A1* | 10/2019 | Sugiyama | ............... F21S 43/26 |
| 2020/0063938 | A1* | 2/2020 | Kurashige | ............... F21V 5/008 |
| 2020/0369199 | A1* | 11/2020 | Nishio | ..................... G02B 5/18 |
| 2022/0221123 | A1* | 7/2022 | Okubo | ..................... B60Q 1/34 |

FOREIGN PATENT DOCUMENTS

| | | | | |
|---|---|---|---|---|
| CN | 109210491 A | * | 1/2019 | .............. F21S 43/14 |
| CN | 109945124 A | * | 6/2019 | |
| JP | 2018-098066 A | | 6/2018 | |

OTHER PUBLICATIONS

Machine Translation of CN 109210491 A retrieved from the FIT database of PE2E search. (Year: 2022).*

* cited by examiner

*Primary Examiner* — Colin J Cattanach
(74) *Attorney, Agent, or Firm* — United One Law Group LLC; Kongsik Kim; Jhongwoo Peck

(57) ABSTRACT

A lamp for a vehicle includes a light source unit for generating light, a shield unit for selectively transmitting at least some of the light generated from the light source unit, and a lens unit for focusing the light that transmits trough the shield unit on a road surface. A main transmission light among the light that is transmitted through the shield unit forms a plurality of road surface patterns, and an auxiliary transmission light among the light that is transmitted through the shield unit is irradiated to one or more selected road surface pattern among the plurality of road surface patterns to increase brightness of the selected road surface pattern.

12 Claims, 15 Drawing Sheets

(a)

(b)

LAMP FOR VEHICLE

CROSS-REFERENCE TO RELATED APPLICATION

This application claims priority to Korean Patent Application No. 10-2020-0135870, filed on Oct. 20, 2020, which is incorporated herein by reference in its entirety.

BACKGROUND

1. Technical Field

The present disclosure relates to a vehicle lamp, and more particularly, relates to a vehicle lamp that forms a rear road surface pattern when the vehicle moves backward.

2. Description of the Related Art

In general, a vehicle includes a vehicle lamp having an illumination function for easily identifying an object located around the vehicle during low light conditions (e.g., night driving) and a signaling function for notifying other vehicles or road users of the driving state of the vehicle.

For example, there are vehicle lamps that operate by directly emitting light using the lamp such as a headlamp that secures the driver's view by irradiating light toward the front, a brake lamp that is turned on when the brake is applied, a direction indicating lamp used when turning right or left, and a reversing lamp that is turned on when reversing. In addition, a reflector, etc., which functions in a manner of reflecting light so that a vehicle can be easily recognized from the outside, is mounted at the front and rear of the vehicle.

Among them, the reversing lamp is turned on when the vehicle is reversing to secure the driver's night vision and/or to notify other vehicles or road users that the vehicle is reversing (i.e., when the transmission of the vehicle is put in reverse) so that they can be on notice.

SUMMARY

An object of the present disclosure is to provide a vehicle lamp that forms a rear road surface pattern when the vehicle moves backwards.

In the vehicle lamp according to embodiments of the present disclosure as described herein, since the rear road surface pattern is formed when the vehicle moves backwards, the reverse motion (e.g., backing) of the vehicle can be more easily recognized by surrounding drivers or pedestrians.

In order to achieve the above object, a lamp for a vehicle according to an embodiment of the present disclosure may include a light source unit for generating light, a shield unit for selectively transmitting at least some of the light generated from the light source unit, and a lens unit for focusing the light that transmits through the shield unit on a road surface.

The light source unit may include a light source for generating the light, and an optical unit for allowing the light generated from the light source to be irradiated with straightness in one direction.

A main transmission light among the light that is transmitted through the shield unit may form a plurality of road surface patterns, and an auxiliary transmission light among the light that is transmitted through the shield unit may be irradiated to one or more selected road surface pattern among the plurality of road surface patterns to increase brightness of the selected road surface pattern. The shield unit may include a main transmission unit having a plurality of main transmission apertures for transmitting the light of the light source unit to form the main transmission light, and an auxiliary transmission unit having at least one auxiliary transmission aperture for transmitting the light of the light source unit to form the auxiliary transmission light. The plurality of main transmission apertures may be arranged at different heights with respect to the road surface, and shape and size of each of the plurality of main transmission apertures may be determined to allow the plurality of road surface patterns to have substantially same shape and size.

Further, a size of a first main transmission aperture disposed above a second main transmission aperture may be greater than a size of the second main transmission aperture. A first road surface pattern projected through the first main transmission aperture may be projected closer to the vehicle lamp than a second road surface pattern projected through the second main transmission aperture. The auxiliary transmission light may be projected through the auxiliary transmission aperture onto the second road surface pattern.

The auxiliary transmission light may be irradiated to a road surface pattern that the main transmission light forms with a lower brightness among the plurality of road surface patterns.

Further, the lens unit may include a convex lens and a concave lens that are stacked together, and the convex lens and the concave lens may have different refractive indices. The light that transmits through the shield unit may transmit through the convex lens after transmitting through the concave lens. The concave lens has a refractive index that is greater than a refractive index of the convex lens. By way of example, the convex lens may include poly methyl methacrylate (PMMA), and the concave lens may include poly carbonate (PC).

An arrangement direction of the light source unit, the shield unit, and the lens unit may be inclined with respect to the road surface.

BRIEF DESCRIPTION OF THE DRAWINGS

These and/or other aspects will become more apparent and more readily appreciated from the following description of the embodiments, taken in conjunction with the accompanying drawings in which.

DETAILED DESCRIPTION

Figure 1:
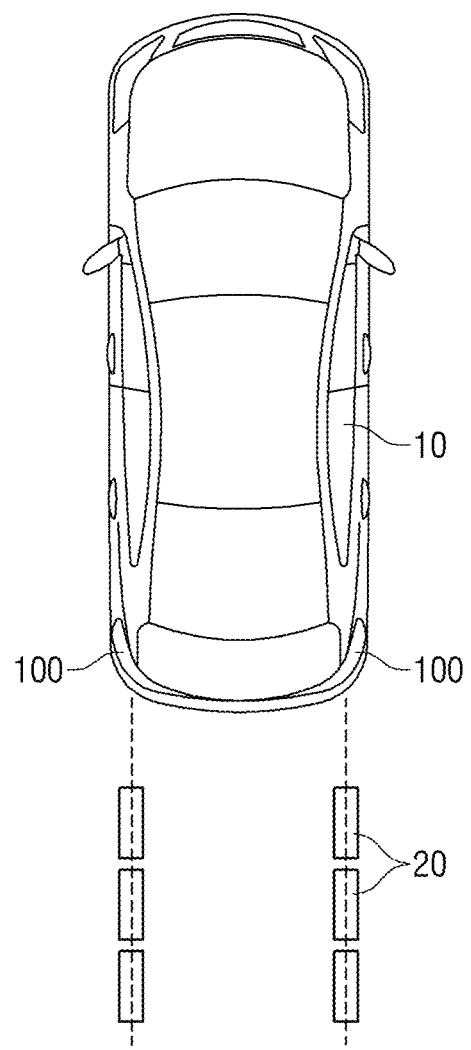
FIGS. 1 and 2 illustrate examples where a road surface pattern is formed by a vehicle lamp according to an exemplary embodiment of the present disclosure.

Hereinafter, exemplary embodiments of the present disclosure will be described in detail with reference to the accompanying drawings. Advantages and features of the present disclosure, and a method of achieving them will be apparent with reference to the embodiments described below in detail together with the accompanying drawings. However, the present disclosure is not limited to the embodiments to be described below, but may be implemented in various different forms, and these embodiments are only provided to make the disclosures complete, and to fully inform the scope of the disclosure to those of ordinary skill in the technical field to which the present disclosure belongs. Further, the invention is only defined by the scope of the claims. The same reference numerals refer to the same components throughout the specification.

Unless otherwise defined, all terms (including technical and scientific terms) used in the present disclosure may bear meanings that can be commonly understood by those of ordinary skill in the art to which the present disclosure belongs. In addition, terms defined in a commonly used dictionary are not to be interpreted ideally or excessively unless explicitly defined specifically.

Figure 2:
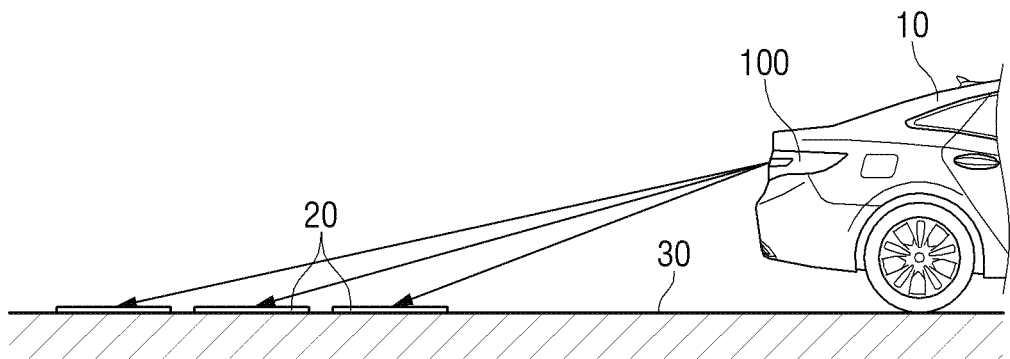

FIGS. 1 and 2 illustrate a road surface pattern that is formed by a vehicle lamp according to an embodiment of the present disclosure. Referring to FIGS. 1 and 2, a vehicle lamp 100 according to an embodiment of the present disclosure may form a road surface pattern 20 on a road surface 30. More specifically, the vehicle lamp 100 may form the road surface pattern 20 by irradiating light on the road surface 30. The road surface pattern 20 may be formed by focusing the light on a specific point of the road surface 30. In the present disclosure, the road surface pattern 20 may be formed on the rear road surface 30 of the vehicle 10 when the vehicle 10 moves backward. Accordingly, the vehicle lamp 100 may be provided at or near the rear of the vehicle 10.

The vehicle 10 may include a plurality of vehicle lamps 100. For example, the vehicle lamp 100 may be provided at the rear left and rear right of the vehicle 10, respectively. Different road surface patterns 20 may be formed by each vehicle lamp 100. Each vehicle lamp 100 may form a plurality of road surface patterns 20. The plurality of road surface patterns 20 may be arranged linearly in substantially parallel with the rear direction of the vehicle 10. Alternatively, in some embodiments of the present disclosure, the plurality of road surface patterns 20 may be arranged in a direction inclined to the left or right with respect to the rear direction of the vehicle 10.

In the present disclosure, each of the plurality of road surface patterns 20 may have substantially same shape and size with one another. For example, as shown in FIG. 1, each road surface pattern 20 may have a rectangular shape having substantially same horizontal and vertical lengths. However, the present disclosure is not limited thereto, and some or all of the plurality of road surface patterns 20 may be different from one another. Hereinafter, the road surface pattern 20 having the same shape and size will be mainly described, by way of example.

In addition, although FIGS. 1 and 2 show that the number of the road surface patterns 20 formed by the vehicle lamp 100 is three, this is merely an example, and the number of the road surface patterns 20 formed by the vehicle lamp 100 may be varied. Hereinafter, a case that three road surface patterns 20 are formed by the vehicle lamp 100 will be mainly described, by way of example.

Figure 3:
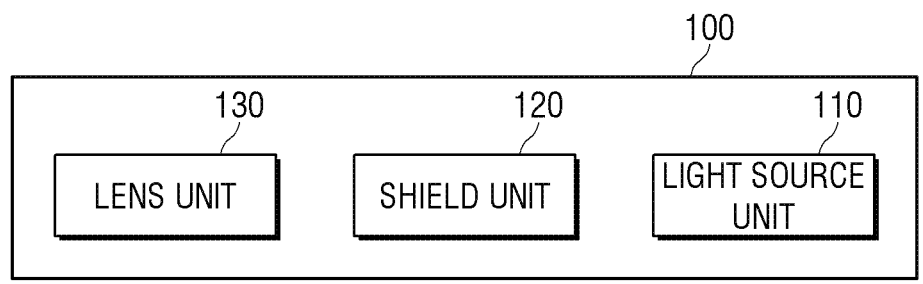
FIG. 3 schematically illustrates the vehicle lamp shown in FIGS. 1 and 2.
Figure 4:
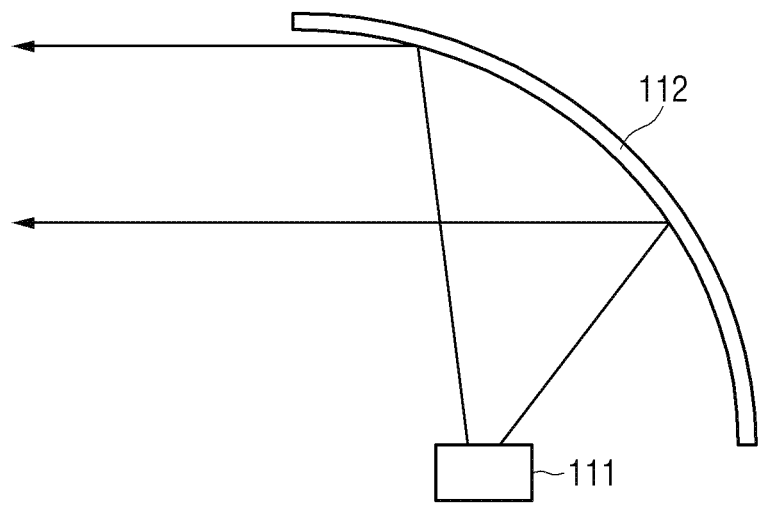
FIG. 4 shows exemplary embodiments of the light source unit shown in FIG. 3.
Figure 4:
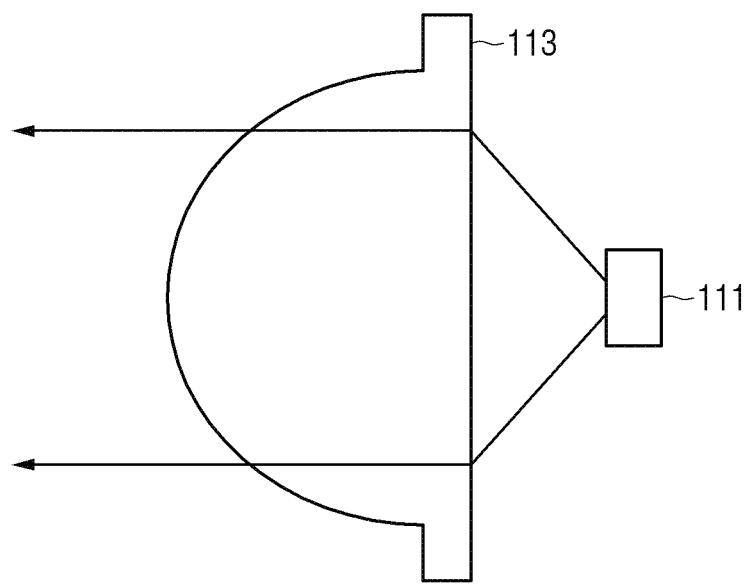

FIG. 3 describes the vehicle lamp shown in FIGS. 1 and 2, and FIG. 4 shows an exemplary embodiment of the light source unit shown in FIG. 3. Referring to FIG. 3, a vehicle lamp 100 according to an embodiment of the present disclosure may include a light source unit 110, a shield unit 120, and a lens unit 130.

The light source unit 110 may generate light. Referring to FIG. 4, the light source unit 110 may include a light source 111 and optical units 112 and 113. The light source 111 may generate and irradiate light. In the present disclosure, the light source 111 may be implemented as a light emitting diode (LED). However, the light source 111 of the present disclosure is not limited to the light emitting diode, and various other types of light-generating components may be used.

The optical units 112 and 113 may allow the light of the light source 111 to be irradiated with straightness in one direction. In some embodiments, the optical units 112 and 113 may allow the light of the light source 111 to be irradiated as a substantially parallel beam. Light having straightness may be transferred to the shield unit 120. The optical units 112 and 113 may be provided in the form of a reflector as shown in panel (a) of FIG. 4, or may be provided in the form of a collimator as shown in panel (b) of FIG. 4. Alternatively, the reflector and the collimator may be combined to form the optical units 112 and 113.

Referring to FIG. 3 again, the shield unit 120 may selectively transmit some of the light generated from the light source unit 110. For example, the shield unit 120 may include a blocking region for blocking light and a transmission region for transmitting light. Some portion of the light of the light source unit 110 may be transmitted through the transmission region, and the remaining portion of the light may be blocked by the blocking region. The light that transmits through the shield unit 120 may be transferred to the lens unit 130.

The lens unit 130 may focus the light that is transmitted through the shield unit 120 on the road surface 30. The light focused on the road surface 30 may form the road surface pattern 20.

The shield unit 120 may include a plurality of transmission regions. A part of the plurality of transmission regions may form a main transmission light, and another part of the plurality of transmission regions may form an auxiliary transmission light. Among the light that is transmitted through the shield unit 120, the main transmission light may be responsible for forming a plurality of road surface patterns 20. The auxiliary transmission light among the light that is transmitted through the shield unit 120 may be irradiated to one or more selected road surface pattern 20 among the plurality of road surface patterns 20 to increase the brightness of the selected road surface pattern 20.

Road surface patterns 20 that are formed only with the main transmission light may have a brightness lower than other road surface patterns 20. As such, by irradiating the auxiliary transmission light to the road surface patterns 20 having a relatively low brightness, the plurality of road surface patterns 20 may be formed on the road surface 30 with an overall uniform brightness.

Figure 5:
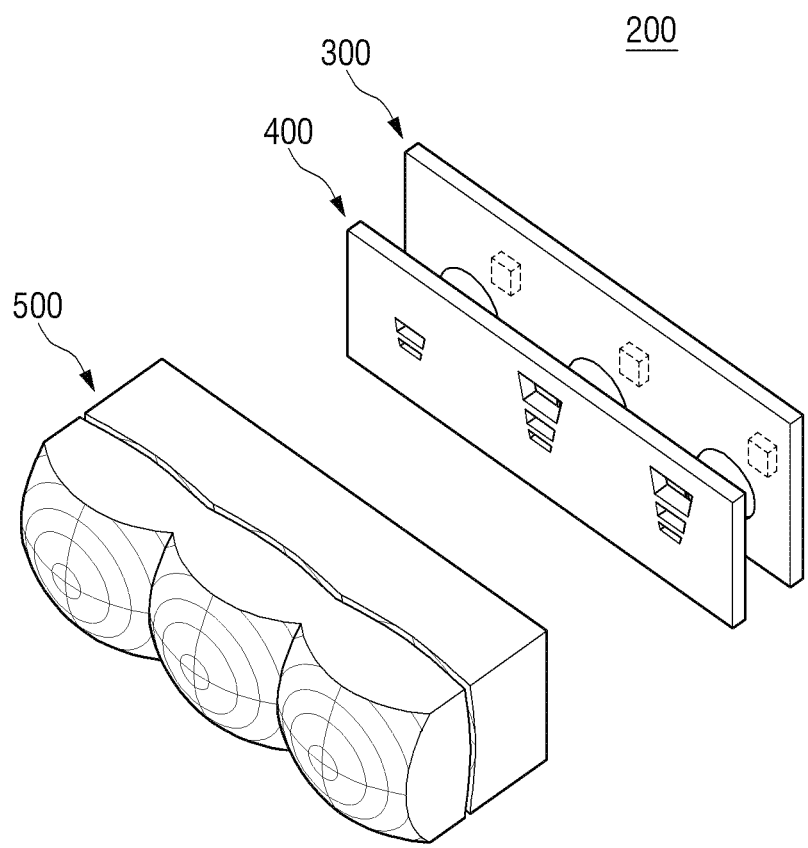
FIGS. 5 to 7 show an exemplary embodiment of the vehicle lamp shown in FIG. 3.
Figure 6:
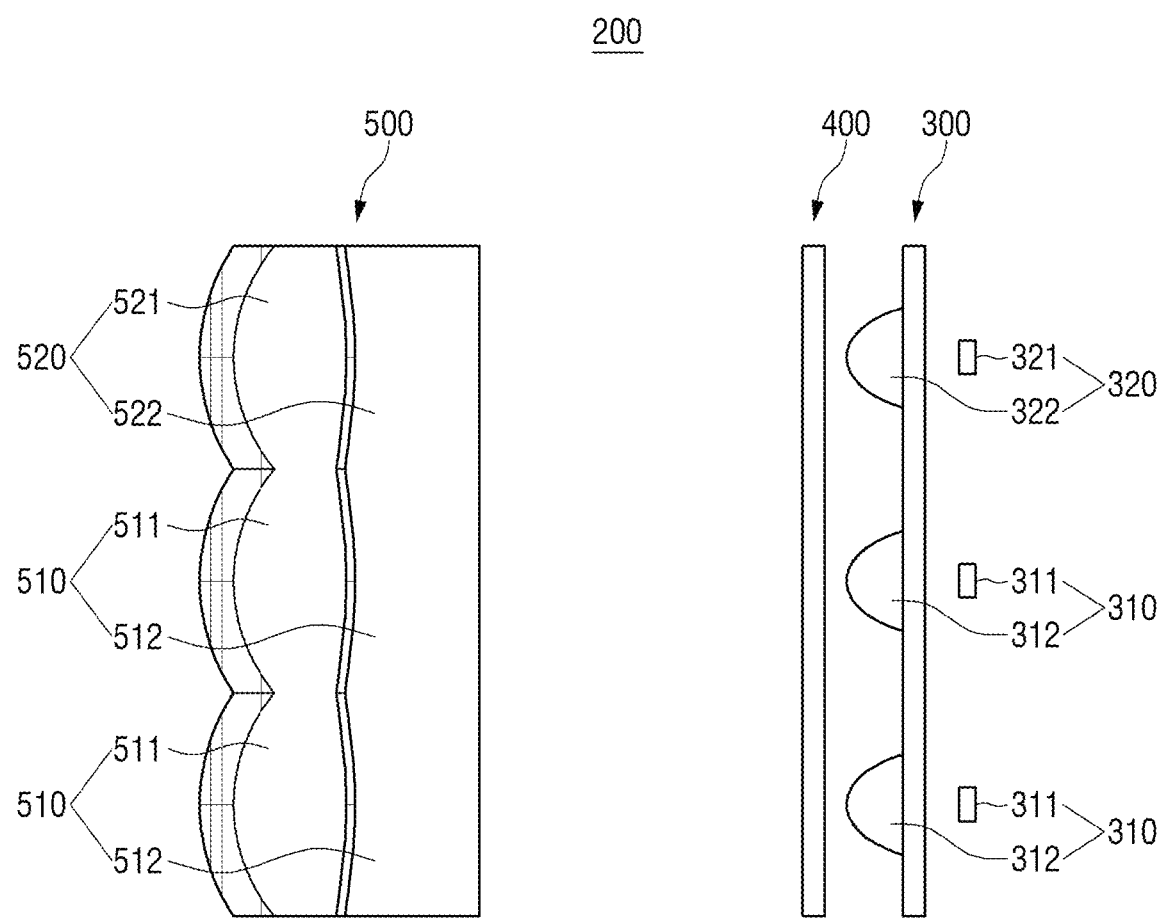
Figure 7:
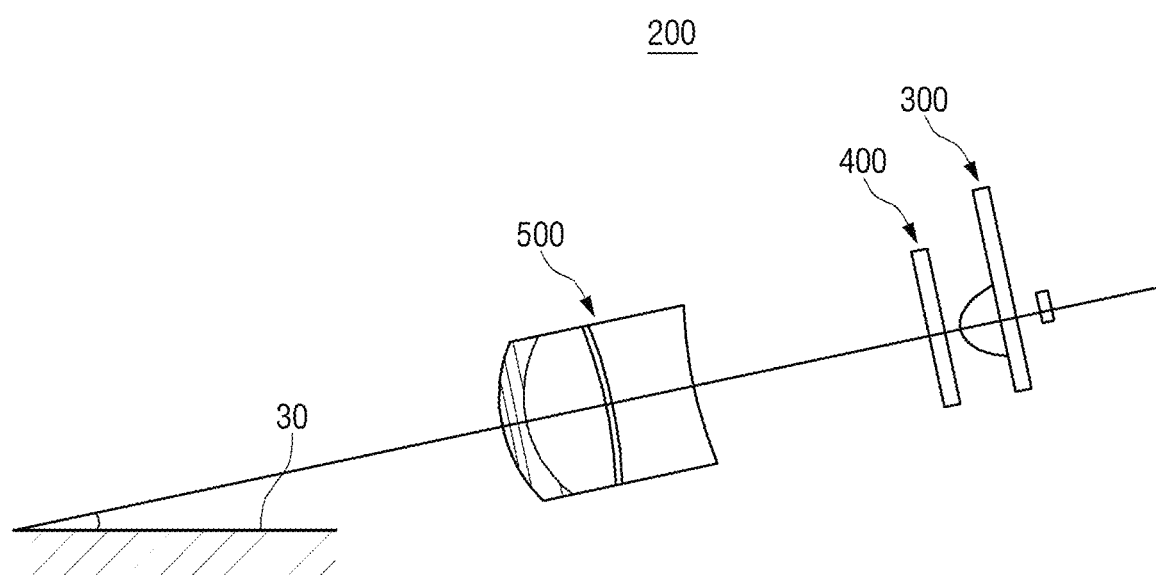
Figure 8:
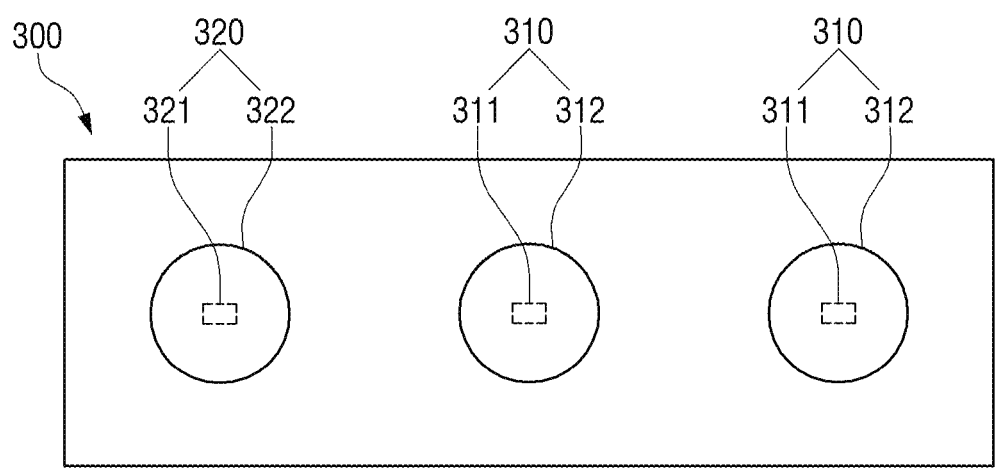
FIG. 8 shows the arrangement relationship of the light source unit with respect to the road surface.
Figure 8:
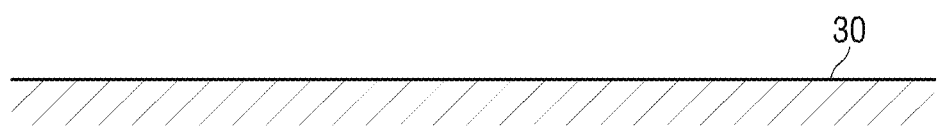
Figure 9:
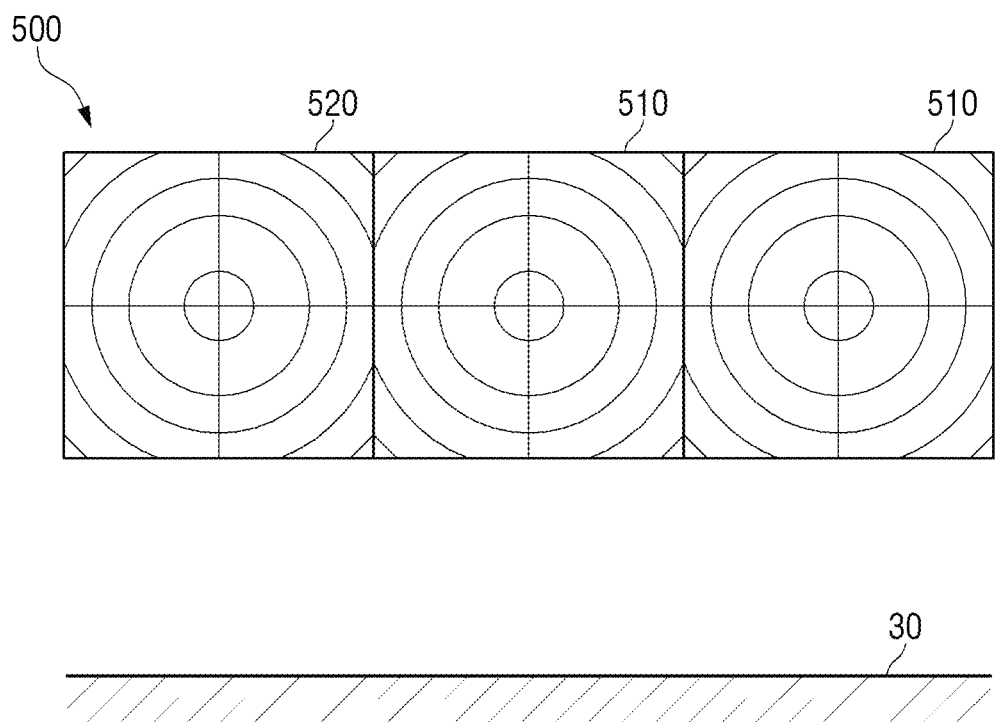
FIG. 9 shows the arrangement relationship of the lens unit with respect to the road surface.
Figure 10:
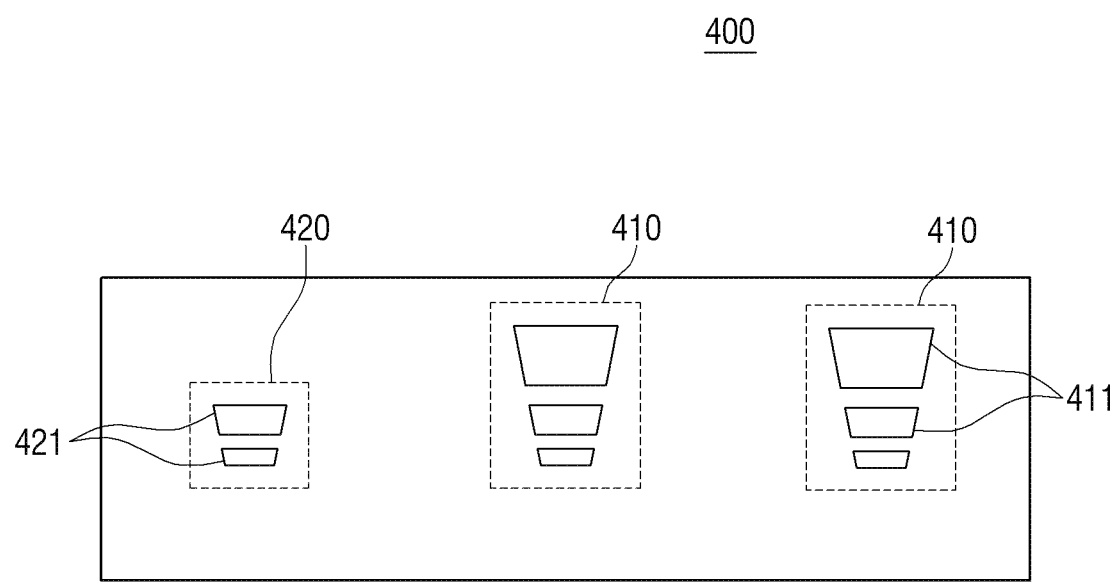
FIG. 10 shows a shield unit according to an exemplary embodiment of the present disclosure.
Figure 11:
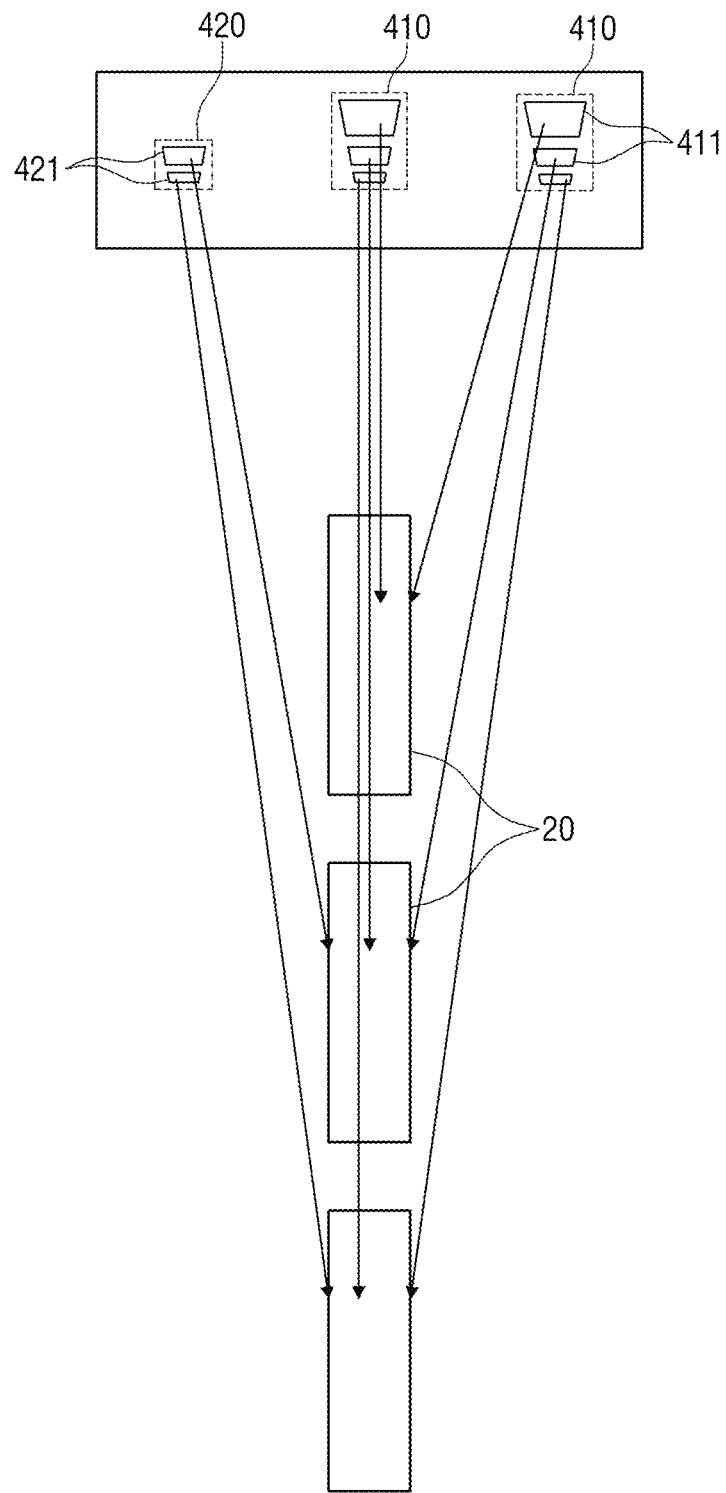
FIG. 11 shows the correspondence relationship between the transmission aperture of the shield unit and the road surface pattern.
Figure 12:
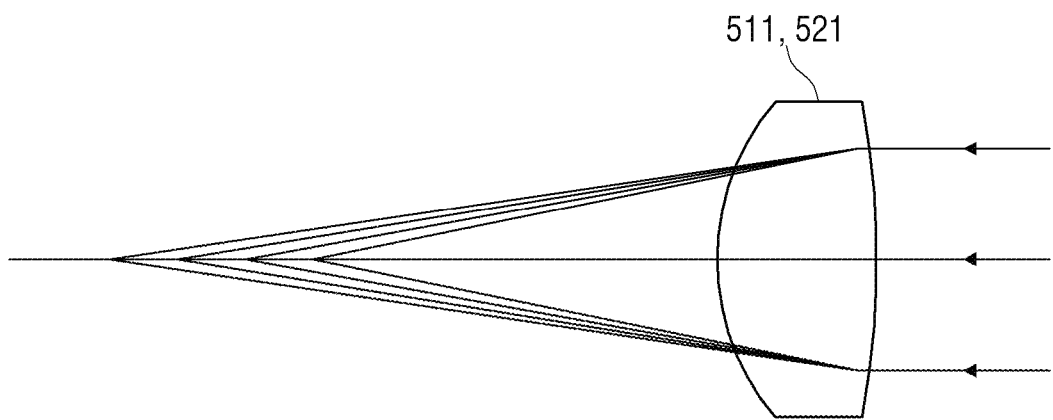
FIG. 12 illustrates chromatic aberration formed by a convex lens.
Figure 13:
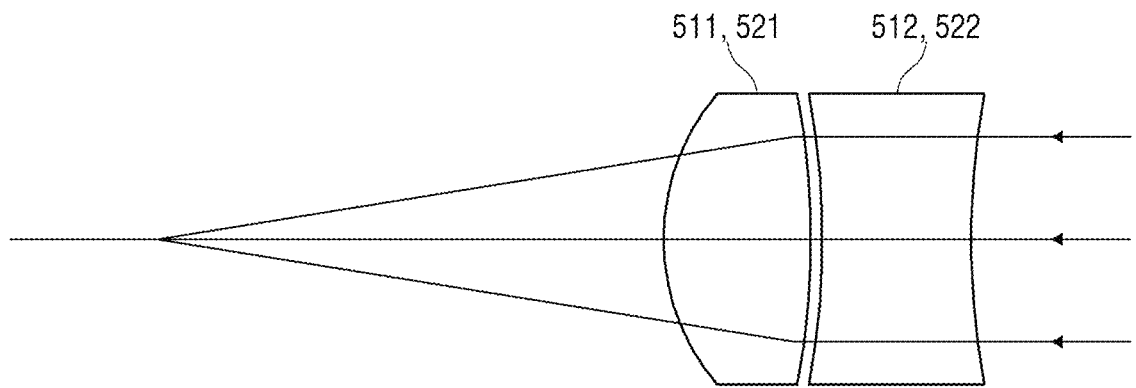
FIG. 13 illustrates that no chromatic aberration is formed by a lens unit according to an exemplary embodiment of the present disclosure.
Figure 14:
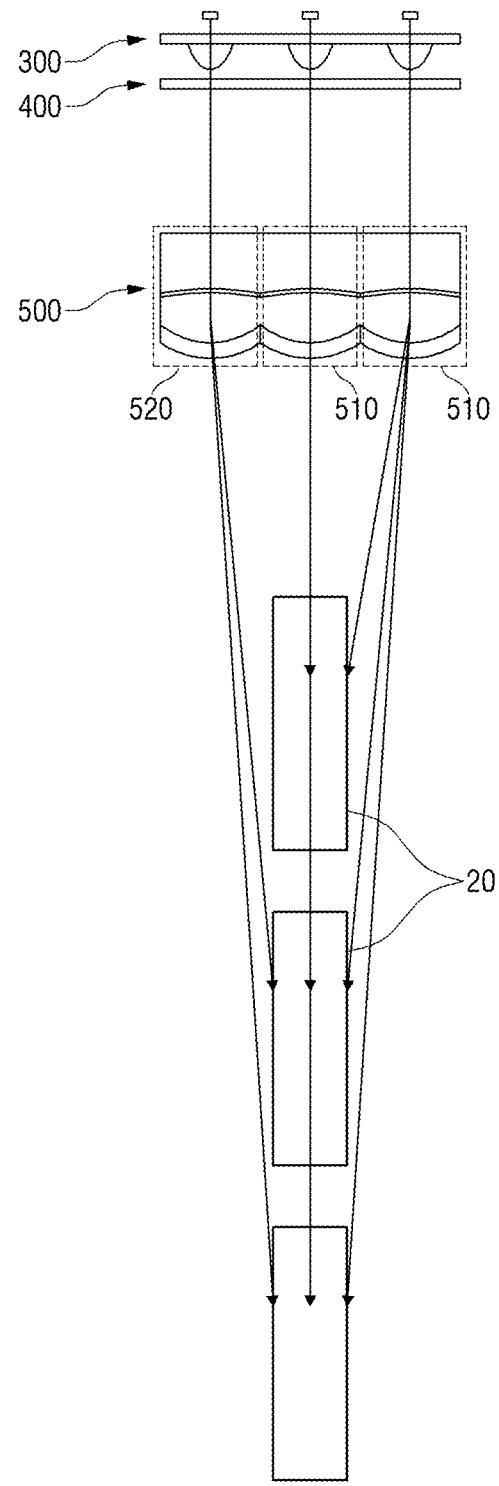
FIGS. 14 and 15 depict the operation of a lens unit according to an exemplary embodiment of the present disclosure.
Figure 15:
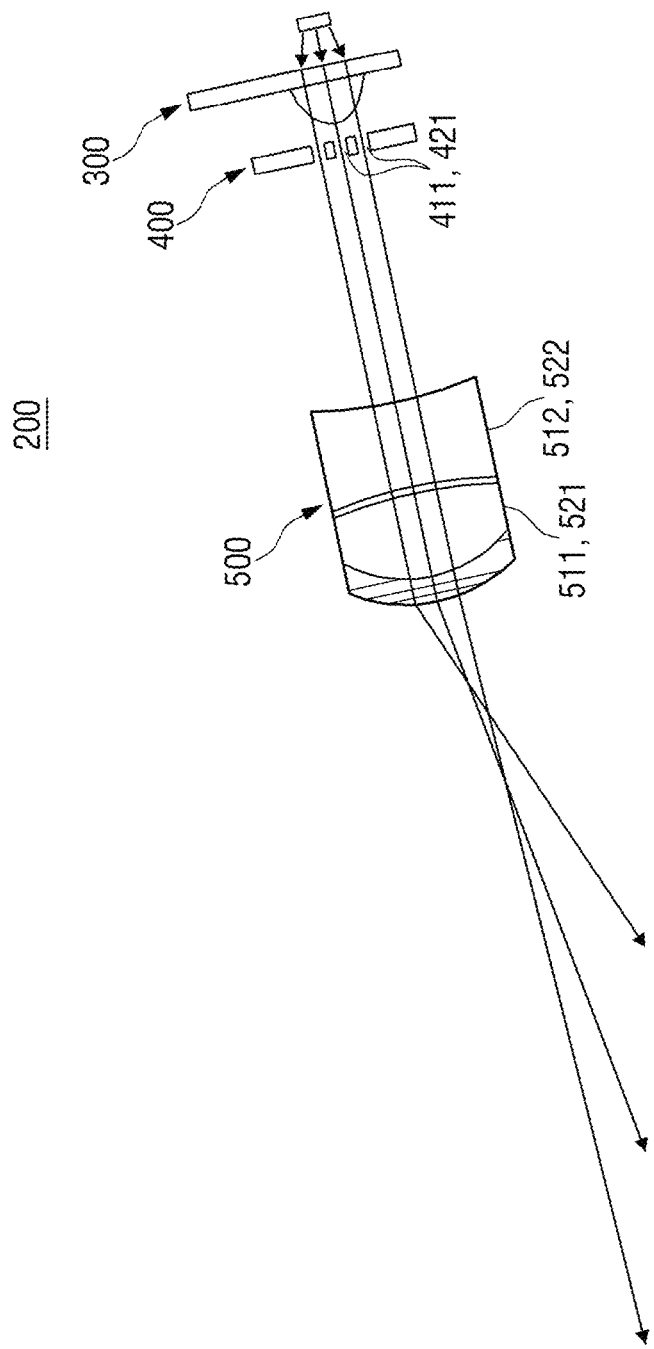

FIGS. 5 to 7 show an exemplary embodiment of the vehicle lamp shown in FIG. 3, FIG. 8 shows the arrangement relationship of the light source unit with respect to the road surface, FIG. 9 shows the arrangement relationship of the lens unit with respect to the road surface, FIG. 10 shows the shield unit according to an embodiment of the present disclosure, FIG. 11 shows the correspondence relationship between the transmission aperture of the shield unit and the road surface pattern, FIG. 12 shows chromatic aberration formed by a convex lens, FIG. 13 shows that no chromatic aberration is formed by the lens unit according to an embodiment of the present disclosure, and FIGS. 14 and 15 depict the operation of the lens unit according to an embodiment of the present disclosure.

Referring to FIGS. 5 and 6, the vehicle lamp 200 according to an embodiment of the present disclosure may include a light source unit 300, a shield unit 400, and a lens unit 500. The light source unit 300, the shield unit 400, and the lens unit 500 may be stacked together. In other words, the shield unit 400 may be arranged in front of the light source unit 300, and the light source unit 300 may be arranged in front of the shield unit 400.

Referring to FIG. 7, the arrangement direction of the light source unit 300, the shield unit 400, and the lens unit 500 may be inclined with respect to the road surface 30. Accordingly, the light generated from the light source unit 300 may transmit through the shield unit 400 and the lens unit 500, and may be projected on the road surface 30 to form the road surface pattern 20.

Referring to FIGS. 5 and 6 again, the light source unit 300 may generate light. In particular, the light source unit 300 may include light sources 311 and 321 and optical units 312 and 322. The light sources 311 and 321 may generate the light. The optical units 312 and 322 may allow the light generated from the light sources 311 and 321 to be irradiated with straightness in one direction. The light having straightness may be transferred to the shield unit 400.

The light source unit 300 may include a main light source unit 310 and an auxiliary light source unit 320. The main light source unit 310 may generate light to form the plurality of road surface patterns 20. The auxiliary light source unit 320 may generate light for enhancing the brightness of the selected road surface pattern 20 among the plurality of road surface patterns 20.

Referring to FIG. 8, the main light source unit 310 and the auxiliary light source unit 320 may be arranged side by side at the same height with respect to the road surface 30. When the performance of the light sources 311 and 321 and the optical units 312 and 322 included in each of the main light source unit 310 and the auxiliary light source unit 320 are the same, the amount of light irradiated to the road surface 30 by the main light source unit 310 and the auxiliary light source unit 320 may be the same.

Referring to FIGS. 5 and 6 again, the shield unit 400 may selectively transmit some of the light generated from the light source unit 300. Referring to FIG. 10, the shield unit 400 may include a main transmission unit 410 and an auxiliary transmission unit 420.

The main transmission unit 410 may include a plurality of main transmission apertures 411 for transmitting the light of the light source unit 300 to form the main transmission light. Specifically, the main transmission unit 410 may transmit the light of the main light source unit 310 through the main transmission apertures 411 to form the main transmission light.

The auxiliary transmission unit 420 may include at least one auxiliary transmission aperture 421 for transmitting the light of the light source unit 300 to form the auxiliary transmission light. Specifically, the auxiliary transmission unit 420 may transmit the light of the auxiliary light source unit 320 through the auxiliary transmission aperture 421 to form the auxiliary transmission light.

The plurality of main transmission apertures 411 provided in the main transmission unit 410 may be arranged at different heights with respect to the road surface 30. In some embodiments, the main transmission unit 410 may have three main transmission apertures 411. Accordingly, the light that transmits through the main transmission unit 410 may form three road surface patterns 20.

The shape and size of each of the plurality of main transmission apertures 411 may be determined so that the plurality of road surface patterns 20 have substantially same shape and size. As will be described later, the road surface pattern 20 that is formed corresponding to a lower main transmission aperture 411 may be formed farther from the vehicle lamp 200, and the road surface pattern 20 that is formed corresponding to an upper main transmission aperture 411 may be formed closer to the vehicle lamp 200.

Since the light that has transmitted through the main transmission aperture 411 is irradiated with diffusion, when the plurality of main transmission apertures 411 have the same size, the road surface pattern 20 by each main transmission aperture 411 may become larger as it is projected farther from the vehicle lamp 200, and may become smaller as it is projected closer to the vehicle lamp 200. In this regards, the sizes of the main transmission apertures 411 may increase as they go upward and decrease as they go downward so that a plurality of road surface patterns 20 may be formed with the same shape and size. When the desired shape of the road surface pattern 20 is a rectangle, the shape of the main transmission aperture 411 may be a trapezoid, and the size of each main transmission aperture 411 may be determined to cause the sizes of the road surface patterns 20 formed on the road surface 30 to be consistent throughout.

Meanwhile, the road surface pattern 20 formed via a smaller main transmission aperture 411 may have a lower brightness than a road surface pattern 20 formed via a larger main transmission aperture 411. In such case, the road surface pattern 20 formed via a lower main transmission aperture 411 may have a lower brightness than a road surface pattern 20 formed via an upper main transmission aperture 411. Therefore, in order to allow the plurality of road surface patterns 20 to be observed with substantially uniform brightness, the auxiliary transmission light may be irradiated to the road surface pattern 20 having a lower brightness among the plurality of road surface patterns 20.

The auxiliary transmission light may form a light pattern having the same or similar shape as the road surface pattern 20 on the road surface 30. To this end, the auxiliary transmission aperture 421 provided in the auxiliary transmission unit 420 may have the same or similar shape and size as at least some of the main transmission apertures 411. Specifically, the shape and size of the auxiliary transmission aperture 421 may be the same as or similar to the shape and size of the main transmission aperture 411 that forms the road pattern 20 with a lower brightness among the plurality of main transmission apertures 411. Accordingly, the light pattern formed on the road surface 30 by being transmitted through the auxiliary transmission apertures 421 may be overlapped (e.g., superposed) with the road surface pattern 20 of the lower brightness so that the overall brightness of the road surface pattern 20 can become more uniform.

Referring to FIG. 11, the light that is transmitted through the plurality of main transmission apertures 411 may form different road surface patterns 20, and the light that is transmitted through the auxiliary transmission apertures 421 may be irradiated to the selected road surface patterns 20.

The light that is transmitted through the plurality of main transmission apertures 411 may form the road surface pattern 20 at different distances from the vehicle lamp 200, respectively. The light that is transmitted through a main transmission aperture 411 arranged above may form a road surface pattern 20 disposed closer to the vehicle lamp 200, and the light that is transmitted through a main transmission aperture 411 arranged below may form a road surface pattern 20 disposed farther from the vehicle lamp 200.

The shield unit 400 may include a plurality of main transmission units 410. The main transmission aperture 411 provided in each main transmission unit 410 may form the same road surface pattern 20. For example, the main transmission aperture 411 arranged at the uppermost portion of the first main transmission unit 410 may form a first road surface pattern, and the main transmission aperture 411 arranged at the uppermost portion of the second main transmission unit 410 may form a second road surface pattern, where the first road surface pattern and the second road surface pattern may overlap. In this case, the edge of the first road surface pattern and the edge of the second road surface pattern may coincide. The above description may be applied to all of the main transmission apertures 411 provided in the first main transmission unit 410 and the second main transmission unit 410, and a plurality of road surface patterns 20 formed by the first main transmission unit 410 may completely overlap a plurality of road surface patterns 20 formed by the second main transmission unit 410.

The light that is transmitted through the auxiliary transmission aperture 421 may be irradiated to one or more road surface pattern 20 having a relatively low brightness among the plurality of road surface patterns 20. As the distance from the vehicle lamp 200 increases, the brightness of the road surface pattern 20 decreases, and the light that is transmitted through the auxiliary transmission aperture 421 may be irradiated to the road surface pattern 20 farther from the vehicle lamp 200. Accordingly, even the road surface pattern 20 farther from the vehicle lamp 200 may be observed with the same or similar brightness with other road surface patterns 20.

Referring to FIGS. 5 and 6 again, the lens unit 500 may focus the light that is transmitted through the shield unit 400 on the road surface 30. The lens unit 500 may include a main lens unit 510 and an auxiliary lens unit 520. The main lens unit 510 may focus the light to form the plurality of road surface patterns 20 on the road surface 30. The auxiliary lens unit 520 may focus light for increasing the brightness of the selected road surface pattern 20 among the plurality of road surface patterns 20 on the road surface 30.

Referring to FIG. 9, the main lens unit 510 and the auxiliary lens unit 520 may be arranged side by side at the same height with respect to the road surface 30. When the performance of the main lens unit 510 and the auxiliary lens unit 520 is the same, the amount of light focused on the road surface 30 by the main lens unit 510 and the auxiliary lens unit 520 may be the same.

Referring to FIGS. 5 and 6 again, the lens unit 500 may be formed by stacking convex lenses 511 and 521 and concave lenses 512 and 522 having different refractive indices. The concave lenses 512 and 522 may have a refractive index that is greater than a refractive index of the convex lenses 511 and 521. For example, the convex lenses 511 and 521 may include or be made of poly methyl methacrylate (PMMA), and the concave lenses 512 and 522 may include or be made of poly carbonate (PC). However, the materials of the convex lenses 511 and 521 and the concave lenses 512 and 522 of the present disclosure are not limited thereto.

As the convex lenses 511 and 521 and the concave lenses 512 and 522 are stacked and aligned, chromatic aberration of the light that transmits through the lens unit 500 may be reduced. As shown in FIG. 12, when the light of the light source unit 300 transmits only through the convex lenses 511 and 521, the light may be separated by wavelengths, and the light for each wavelength may have different focal lengths. Consequently, the edge of the road surface pattern 20 may become unclear, and noticeable color (e.g., chromatic aberration) may appear.

As shown in FIG. 13, however, when the light of the light source unit 300 transmits through the convex lenses 511 and 521 and the concave lenses 512 and 522, the focal length of the light for each wavelength may become uniform. In this case, the edge of the road surface pattern 20 may become clearer. Consequently, the light that transmits through the shield unit 400 may transmit through the convex lenses 511 and 521 after transmitting through the concave lenses 512 and 522. The convex lenses 511 and 521 may focus incident light on a focal point. Accordingly, the light that transmits through the convex lenses 511 and 521 may be focused on the road surface 30 so that the shape of the road surface pattern 20 can be observed more clearly.

Referring to FIGS. 14 and 15, the lens unit 500 may focus the light that transmits through the shield unit 400 on the road surface 30. In this regard, the lens unit 500 may refract the light that is transmitted through the shield unit 400 to be focused on the road surface 30. The light focused on the road surface 30 may form the road surface pattern 20. The main lens unit 510 and the auxiliary lens unit 520 may refract the light so that the light is irradiated to the corresponding road surface pattern 20.

Referring to FIG. 15, the lens unit 500 may refract the light so that the light is focused at different positions on the road surface 30 based on the position of the transmission aperture provided in the shield unit 400. The lens unit 500 may refract the light so that the light may be focused at a position closer to the vehicle lamp 200 as the position of the transmission aperture is higher, and refract the light so that the light may be focused at a position farther from the vehicle lamp 200 as the position of the transmission aperture is lower. The light that transmits through different transmission apertures may be refracted by the lens unit 500 and then be focused on the road surface 30 to form the road surface patterns 20 at different locations.

Although the embodiments of the present disclosure have been described with reference to the above and the accompanying drawings, those of ordinary skill in the art, to which the present disclosure pertains, can understand that the present disclosure may be implemented in other specific forms without changing the technical spirit or essential features. Therefore, it should be understood that the embodiments described above are illustrative and non-limiting in any aspect.

What is claimed is:
1. A lamp for a vehicle comprising:
a light source unit for generating light;
a shield unit for selectively transmitting at least some of the light generated from the light source unit; and
a lens unit for focusing the light that is transmitted through the shield unit on a road surface,
wherein the shield unit comprises:

a main transmission unit including a plurality of main transmission apertures for transmitting the light of the light source unit and forming a main transmission light that is irradiated on the road surface to form an overall road surface pattern which comprises a plurality of road surface patterns; and an auxiliary transmission unit including at least one auxiliary transmission aperture for transmitting the light of the light source unit and forming an auxiliary transmission light that is irradiated to one or more selected road surface pattern among the plurality of road surface patterns, wherein the main transmission light forms a complete set of features of the overall road surface pattern, and wherein a subset of the features, which is less than the complete set, of the overall road surface pattern formed by the main transmission light, the subset of the features being disposed farthest from the vehicle in the overall road surface pattern, is irradiated with the auxiliary transmission light and overlapped with the main transmission light to allow brightness thereof to be increased such that all of the plurality of road surface patterns have substantially uniform brightness.

2. The vehicle lamp of claim 1, wherein the light source unit comprises, a light source for generating the light; and an optical unit for allowing the light generated from the light source to be irradiated with straightness in one direction.

3. The vehicle lamp of claim 1, wherein the plurality of main transmission apertures are arranged at different heights with respect to the road surface, and wherein shape and size of each of the plurality of main transmission apertures are determined to allow the plurality of road surface patterns to have substantially same shape and size.

4. The vehicle lamp of claim 1, wherein a road surface pattern to be irradiated with the auxiliary transmission light is selected among the plurality of road surface patterns as such road surface pattern that the main transmission light alone, without the auxiliary transmission light, would form with a lower brightness than other road surface patterns.

5. The vehicle lamp of claim 1, wherein the lens unit includes a convex lens and a concave lens stacked together, and wherein the convex lens and the concave lens have different refractive indices.

6. The vehicle lamp of claim 5, wherein the light that transmits through the shield unit transmits through the convex lens after transmitting through the concave lens.

7. The vehicle lamp of claim 5, wherein the concave lens has a refractive index greater than a refractive index of the convex lens.

8. The vehicle lamp of claim 5, wherein the convex lens includes poly methyl methacrylate (PMMA), and the concave lens includes poly carbonate (PC).

9. The vehicle lamp of claim 1, wherein an arrangement direction of the light source unit, the shield unit, and the lens unit is inclined with respect to the road surface.

10. The vehicle lamp of claim 3, wherein a size of a first main transmission aperture disposed above a second main transmission aperture is greater than a size of the second main transmission aperture.

11. The vehicle lamp of claim 10, wherein a first road surface pattern projected through the first main transmission aperture is projected closer to the vehicle lamp than a second road surface pattern projected through the second main transmission aperture.

12. The vehicle lamp of claim 11, wherein the auxiliary transmission light is projected through the auxiliary transmission aperture onto the second road surface pattern.

* * * * *